(12) United States Patent
Christian (10) Patent No.: US 8,699,860 B2
(45) Date of Patent: Apr. 15, 2014

(54) METHOD OF SCHEDULED AND NON-SCHEDULED ACQUISITION OF MEDIA SERVICES IN RESPONSE TO MEDIA SERVICE PROVIDER COMMANDS

(75) Inventor: Michael Ray Christian, Carmel, IN (US)

(73) Assignee: Thomson Licensing, Issy les Mooulineaux (FR)

( * ) Notice: Subject to any disclaimer, the term of this patent is extended or adjusted under 35 U.S.C. 154(b) by 58 days.

(21) Appl. No.: 12/885,417

(22) Filed: Sep. 17, 2010

(65) Prior Publication Data

US 2011/0064390 A1 Mar. 17, 2011

Related U.S. Application Data

(60) Provisional application No. 61/243,499, filed on Sep. 17, 2009.

(51) Int. Cl.
| | |
|---|---|
| H04N 5/76 | (2006.01) |
| H04N 7/16 | (2011.01) |
| H04N 7/025 | (2006.01) |
| H04N 7/173 | (2011.01) |
| G06F 15/16 | (2006.01) |
| G06F 17/00 | (2006.01) |
| G08B 1/08 | (2006.01) |

(52) U.S. Cl.
USPC ...... 386/291; 340/539.16; 709/217; 715/202; 725/33; 725/34; 725/90; 725/94; 725/113; 725/116; 725/134; 725/142

(58) Field of Classification Search
USPC ......... 386/291, E5.003; 348/E7.063, E7.071; 709/217; 715/202; 725/33, 34, 90, 94, 725/113, 116, 134, 142; 340/539.16
See application file for complete search history.

(56) References Cited

U.S. PATENT DOCUMENTS 6,993,782 B1 1/2006 Newberry et al.
7,308,697 B1 * 12/2007 Jerding et al. .................. 725/34

(Continued)

FOREIGN PATENT DOCUMENTS

WO WO9911065 3/1999
WO WO0027119 5/2000

OTHER PUBLICATIONS

American National Standard: "Emergency Alert Messaging for Cable", Society of Cable Telecommunications Engineers, ANSI/SCTE 18 2007, pp. 1-31.
OpenCable Specifications: "OpenCable Host Device 2.1 Core Functional Requirements", 2009 Cable Television Laboratories, Inc., OC-SP-HOST2.1-CFR-109-090904, 2006, pp. 1-191.

(Continued)

Primary Examiner — Daquan Zhao
Assistant Examiner — Syed Hasan
(74) Attorney, Agent, or Firm — Vincent E. Duffy; Joel M. Fogelson (57) ABSTRACT

A first media service is acquired in response to a scheduled acquisition command, where the acquiring operation is performed by a user receiver. The time the acquiring operation takes place depends on information in the command, which indicates when the acquiring operation is supposed to take place and when operation terminates. The receipt of a non-scheduled command by the user receiver causes the acquisition of a second media service, where upon the expiration of the non-scheduled command, the first media service is re-acquired. Upon the expiration of the scheduled command, a third media service is automatically acquired, where the third media service was previously selected by a user.

16 Claims, 7 Drawing Sheets

(56) References Cited

U.S. PATENT DOCUMENTS

| | | |
|---|---|---|
| 7,592,912 B2* | 9/2009 | Hasek et al. ............. 340/539.16 |
| 2004/0003398 A1* | 1/2004 | Donian et al. ................. 725/34 |
| 2007/0083901 A1* | 4/2007 | Bond ............................. 725/94 |
| 2008/0052751 A1* | 2/2008 | Cromarty et al. ............. 725/113 |
| 2010/0064025 A1* | 3/2010 | Nelimarkka et al. ......... 709/217 |

OTHER PUBLICATIONS

ATSC Standard: "Program and System Information Protocol for Terrestrial Broadcast and Cable (PSIP)", Advanced Television Systems Committee Inc., Document A/65:2009, Apr. 14, 2009, pp. 1-148.

* cited by examiner

METHOD OF SCHEDULED AND NON-SCHEDULED ACQUISITION OF MEDIA SERVICES IN RESPONSE TO MEDIA SERVICE PROVIDER COMMANDS

REFERENCE TO RELATED PROVISIONAL APPLICATION

This application claims priority from provisional application No. 61/243,499, entitled "Scheduled and Nested Forced Tunes" filed on Sep. 17, 2009.

TECHNICAL FIELD OF THE INVENTION

The present disclosure generally relates to digital content systems and digital video recording systems, and more particularly, systems that are used for acquiring media services.

BACKGROUND OF THE INVENTION

When a user receives a media service from a service provider, the user typically controls the experience of what is seen and when such a media service is viewed or heard. Sometimes though, a service provider will issue a command such as a forced channel tune that will cause a receiver to change from a first media service to a second media service, where the receiver will remain on the designated media service indefinitely.

SUMMARY

An illustrative method is disclosed that provides a user receiver to acquire multiple media services at different times and from different media service providers. The control of the user receiver will be dependent on user commands, scheduled acquisition commands from a media service provider, and non-scheduled acquisition commands from a media service provider, as well. The operation of the user receiver and what media services will be acquired will further depend on the expiration of the scheduled and non-scheduled commands.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures can be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

For purposes of the specification, the term media service can be: a video based media, an audio based media, a television show, a movie, an interactive service, a video game, a video on demand, an audio/video broadcast, a radio program, alert, a podcast, and the like. The term media source is from whom a media service comes from. Such media sources can be: an over the air television program broadcaster, a cable television broadcaster, a satellite television broadcaster, a radio broadcaster, a source that transmits said media service in the form of internet protocol packets, a streaming media service source, a source of a video on demand media service, a source of a podcast, a source of a video game, a source of an interactive service, a source of an audio/video broadcast, and the like.

The term media service provider is the distributor of a media service from a media source. Media service providers can be: a service provider, an internet service provider, a television broadcaster, a radio broadcaster, a multiple service operator, a cable operator, a telephony operator, a digital subscriber line operator, a satellite operator, a fiber optic line operator, an internet protocol television service provider, and a streaming media service provider, a cell phone service provider, over the top service provider, and a mobile device service provider.

A media service provider and a media source can be the same party in some cases such as a broadcaster who broadcasts a television channel as a media source over the airwaves. A media service provider and a media source can also be different entities, as well. For example, a broadcaster can provide a media service (as a media source), but the broadcaster does not broadcast the media service directly to a user. Instead, the broadcaster has a media service provider, such a cable operator/satellite operator/multiple service provider, transmit the media service.

Acquiring is meant as a general term to cover any one of the these situations which are used to acquire a media service: tuning to a first broadcast channel, downloading, switching from a first broadcast channel to a second broadcast channel, joining an internet protocol address, switching from a first internet protocol address to a second internet protocol address, accessing a media service interactive service, a source of an audio/video broadcast, switching from a first internet protocol address to a first broadcast channel, switching from a first broadcast channel to a first internet protocol address.

A scheduled acquisition command (such as forced tune and the like) is an action from a media service provider, which is not a command from a user, which causes a user receiver to acquire a media service. For example, if a media service provider were a broadcaster or cable company, a directed channel change command which causes a receiver to change from a broadcast channel to a second broadcast channel. In the context of ATSC A/65, such a channel change command would be communicated by a media service provider as part of a directed channel change selection code table, although other commands can be communicated by a media service provider to a user receiver to acquire a media service. Such commands can indicate a particular media service, media service source, or media service provider.

A schedule acquisition command for a cable operator/over the air broadcast operator can indicate a source for a media service via a source identifier, a specific frequency for a media service, broadcast information which indicates a media service in the form of PSIP information, channel number for a media service, program identifier for audio of a media service (in a multiplex such as MPEG-2 transport stream), program identifier for video (in an MPEG-2 transport stream), CableLabs communication as defined in OC-SP-HOST2.1-CFR-109-090904, and the like. A schedule acquisition command for a telephony/internet provider can indicate a particular Internet Protocol address which can be joined to get a media service, a hypertext transport protocol link for a media service, a file transport protocol link for a media service, and Real Time Streaming Protocol link for a media service, and the like. A schedule acquisition command for a satellite operator can indicate a specific transponder for a media service. These examples of what a schedule acquisition command is for cable/television/satellite/telephony/Internet provider are illustrative and are not limiting.

An optional aspect to the scheduled acquisition command is that such a command is time based. This means that the scheduled acquisition command will indicate a specific time in which a particular media service is to be acquired. As an additional option, a scheduled acquisition command can have a second variable that indicates when the command expires (as a time variable). That is, when an expiration takes place, a user receiver can change back to media service that was previously being acquired. Note, such time information (when to change and/or the expiration information) is not required for a scheduled acquisition command.

A non-scheduled acquisition command is an action from a media service provider, not a user, which causes a user receiver to acquire a media service, which can be an alert (audio, video, text message, combination thereof, a new media service, and the like). A non-scheduled acquisition command is typically issued in real time and reflects a situation where there is an emergency or an alert. For example, an emergency alert command in compliance with the Society of Cable Telecommunication Engineers (SCTE) 18 is one example of this type of emergency alert command. Such a format is adopted for transmission system as CableLabs DeviceHost 2.1 Core Functional requirements (from OC-SP-HOST2.1-CFR-109-090904). Once again, these are examples of non-scheduled acquisition commands are not to be limiting.

An optional aspect of a non-scheduled acquisition command is that such a command can have a time expiration function, without having a specific function which indicates when the change is supposed to take place. For example, it is expected that a scheduled acquisition command will indicate to a user receiver, at a time in the future, when a media service should be acquired as contrasted against a non-scheduled acquisition command that tells a receiver to acquire a media service at the time the command is received from a media service provider. Both the scheduled and non-scheduled acquisition commands can have expirations which are specifically defined in the commands themselves. Alternatively, the expiration for non-scheduled command can have a default value in which the user receiver determines when the non-scheduled command will expire (if such information is not explicit in the command itself).

A method and device for optimal playback positioning in digital video content are provided. The present disclosure relates to a mechanism of tagging scenes or significant points in content in a prioritized way, and defines a mechanism to utilize this tagging associated with the content to facilitate stopping or starting at appropriate points for playback, e.g., when pressing a scene skip button to jump forward or back to another scene, or when pressing Play after inputting a fast-forward (FF) or rewind (Rew) instruction.

Figure 1:
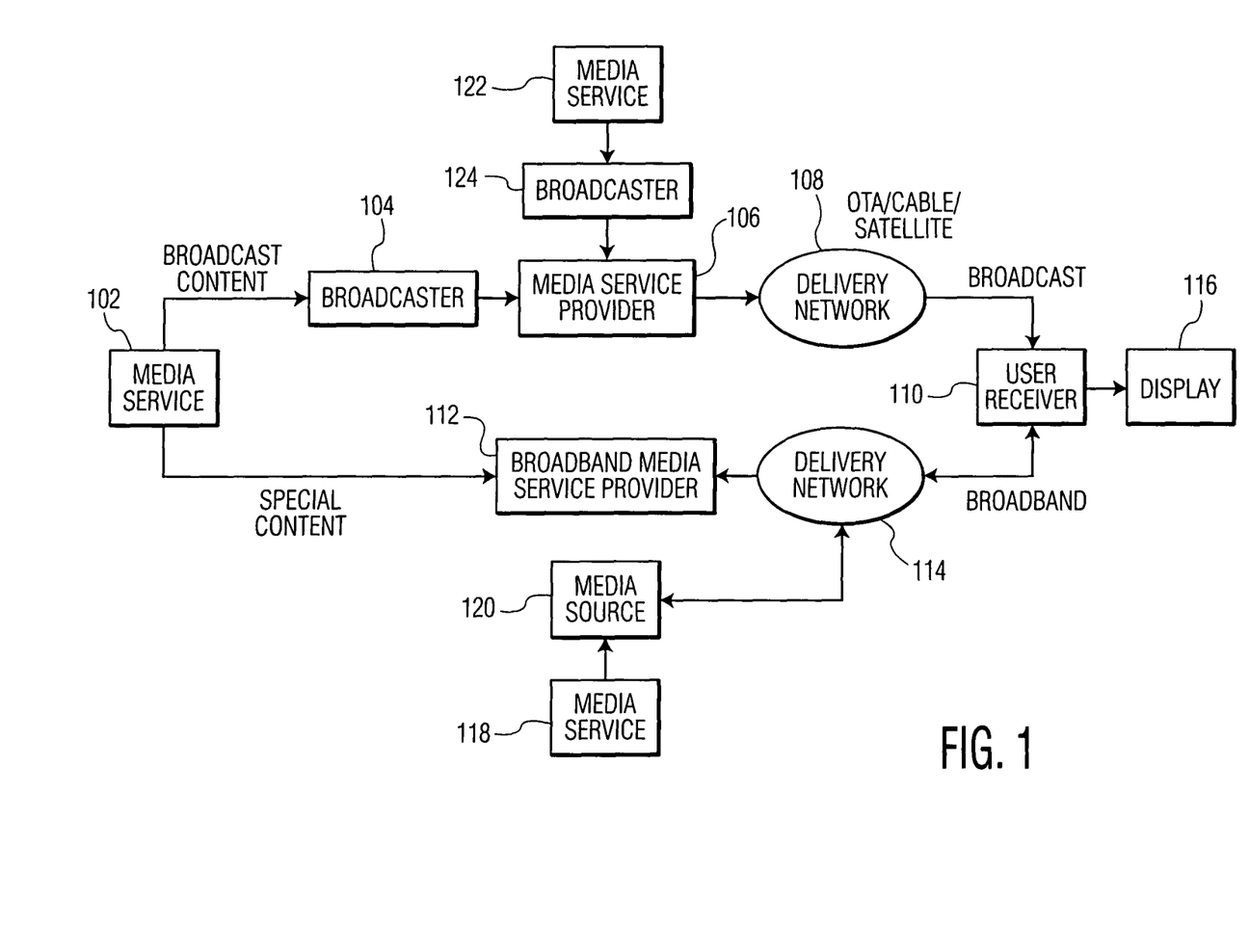
FIG. 1 is a block diagram of an exemplary system for delivering video content in accordance with the present disclosure.

Turning now to FIG. 1, a block diagram of an embodiment of a system 100 for delivering a media service to the home or end user is shown. The media service originates from a media source 102, such as a movie studio or production house. The media service, in this illustrative example, can be supplied in at least one of two forms. One form may be a broadcast form of content. The broadcast content is provided to the broadcaster 104, which can be a national or local affiliate of a broadcaster, such as the American Broadcasting Company (ABC), NBC, CBS, etc. that transmits a media service in the form of a television broadcast.

Broadcaster 104 can collect and store the media service from media source 102. Broadcaster 104 can also schedule delivery of the media service over a delivery network which is operated by media service provider 106. Media service provider 106 can operate a delivery network 108 which is over a delivery mechanism such as an over the air broadcast, a cable network (i.e., COMCAST) which aggregates media services from a plurality of broadcasters, a satellite network (i.e., DIRECTV, DISH NETWORK) which aggregates media services from a plurality of broadcasters, and the like. The locally delivered content is provided to a user receiver such as a set top box/recorder (DVR) 110 in a user's home. For illustrative purposes, a media service 122 is communicated from broadcaster 124 to media service provider 106. This second broadcaster 124 shows that media service provider 106 can accommodate a plurality of broadcasters who supply different media services.

A second illustrative form for the delivery of a media service is described as is referred to as special content. Special content may include a media service that is delivered as premium viewing, pay-per-view, or other content otherwise not provided by a broadcaster 104. In many cases, the special content is a media service requested by the user. The special content can be delivered to a broadband media service provider 112. Broadband media service provider 112 can be a service provider of an Internet based service such as streaming media, podcasts, websites, and interactive content. Broadband media service provider 112 can also incorporate other Internet based media services into the delivery system and in some cases can provide content from broadcasters (104, 124) within the delivery system.

Broadband media service provider 112 can deliver a media service 102 to the user receiver 110 over a separate delivery network 114. Delivery network 114 can include a high-speed broadband based Internet Packet type communications system such as a fiber optic network, Digital Subscriber Line, cellular data network. It is important to note that the content from the broadcaster 104 may also be delivered using all or parts of delivery network 114 and content from broadband media service provider 112 may be delivered using all or parts of delivery network 108.

In addition, a user can also obtain a media service 118 directly from the Internet via delivery network 114 without having the media service 118 being controlled by the broadband media service provider 112. That is, media source 120 which supplies media service 118 can be a supplier of media services, as well as broadband media service provider 112 that supplies media service 102. This situation accounts for the presence of streaming media services that are supplied by over the top providers such as NETFLIX, AMAZON, ITUNES, HULU, and the like are independent from the control of broadband media service provider 112.

The set top box/digital video recorder 110 (user receiver) can receive different media services from one or both of delivery network 108 and delivery network 114, in this example. The set top box/digital video recorder 110 processes media services, and provides a separation of the content based on user preferences and commands. The set top box/digital video recorder can include a storage device, such as a hard drive or optical disk drive, for recording and playing back audio and video content. Further details of the operation of the set top box/digital video recorder 110 and features associated with playing back stored content will be described below in relation to FIG. 2. The processed content is provided to a display device 116. The display device 116 can be a conventional 2-D type display or can alternatively be an advanced 3-D display.

Figure 2:
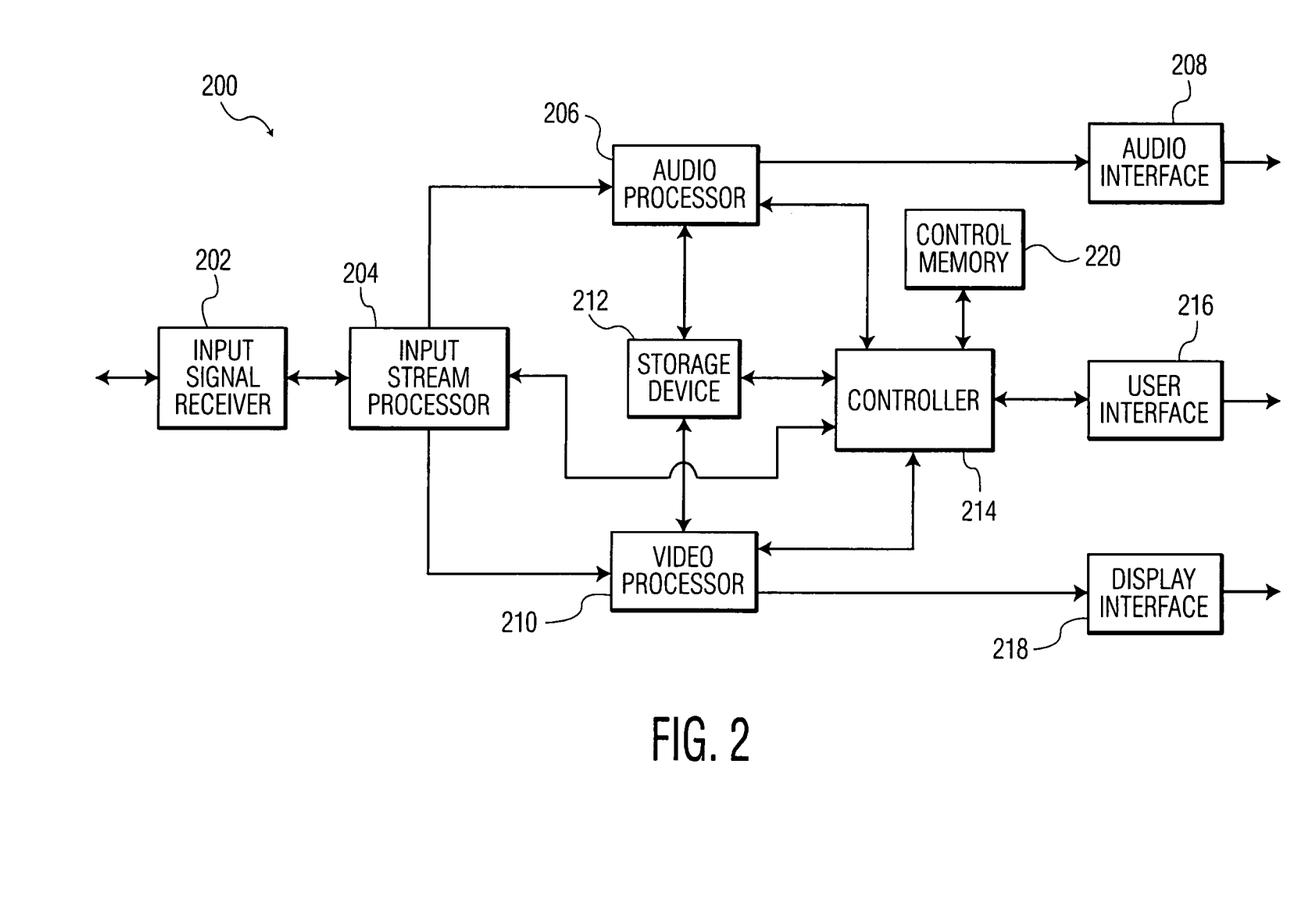
FIG. 2 is a block diagram of an exemplary user receiver accordance with the present disclosure.

Turning now to FIG. 2, a block diagram of an embodiment of the core of a set top box/digital video recorder 200 is shown. The device 200 shown can also be incorporated into other systems including display device 116. In either case, several components necessary for complete operation of the system are not shown in the interest of conciseness, as they are well known to those skilled in the art.

In the device 200 shown in FIG. 2, the content is received in an input signal receiver 202. The input signal receiver 202 may be one of several known receiver circuits used for receiving, demodulating, and decoding signals provided over one of the several possible networks including over the air, cable, fiber, satellite, Ethernet, fiber and phone line networks. The desired input signal may be selected and retrieved in the input signal receiver 202 based on user input provided through a control interface (not shown). The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device 116 or an audio amplifier (not shown). Alternatively, the audio interface 208 may provide a digital signal to an audio output device or display device using an HDMI (High-Definition Multimedia Interface) cable or alternate audio interface such as via a SPDIF (Sony/Philips Digital Interconnect Format). The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216. The storage device 212 may be a hard disk drive, one or more large capacity integrated electronic memories, such as static random access memory, or dynamic random access memory, or may be an interchangeable optical disk storage system such as a compact disk drive or digital video disk drive.

For purposes of the invention, control memory 220 and/or storage device 212 can store information regarding how to acquire a media service, a source of a media service, media service provider, time that a acquisition of a media service is supposed to take place, the time the command for the acquisition of a media service expires, and what other media services were previously acquired.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as high definition multimedia interface (HDMI).

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. The controller 214 is further coupled to control memory 220 (e.g., volatile or non-volatile memory, including random access memory, static RAM, dynamic RAM, read only memory, programmable ROM, flash memory, EPROM, EEPROM, etc.) for storing information and instruction code for controller 214. Further, the implementation of the memory may include several possible embodiments, such as a single memory device or, alternatively, more than one memory circuit connected together to form a shared or common memory. Still further, the memory may be included with other circuitry, such as portions of bus communications circuitry, in a larger circuit.

The operation of user receiver 200 provides that the device can switch back from various media service provider sources. For example, receiver 200 can switch from acquiring a first media service from an Internet Protocol address to a second media service from an over the air broadcaster. The same receiver can later switch back from the over the air broadcaster to the Internet Protocol address, previously subscribed to.

In the explanation of FIGS. 3-6, several different variables are defined which indicate when media service(s) is/are to be acquired respective to a time axis. That is, these are the times when specific actions or commands are issued and/or performed by a user receiver.

Tu=Time selected by a user to select a specific media service

Tss=Time when a scheduled acquisition command (from a media service provider, not a user) is received by a media service provider Tstart=Scheduled (specified) time when a user receiver is to acquire a media service as defined in the scheduled acquisition command (from a media service provider, not a user)

Tstop=Scheduled (specified) time when a user receiver can stop a media service specified in a scheduled acquisition command (from a media service provider, not a user) from being acquired. The command expires.

Tnstart=The time when a non-scheduled acquisition command (from a media service provider, not a user) forces a user receiver to acquire a media service.

Tnstop—The time when a user receiver can stop a media service specified in a non-scheduled acquisition command (from a media service provider, not a user) from being acquired. The command expires.

T=time

The differences in the levels illustrate the acquisition between different media services.

Figure 3:
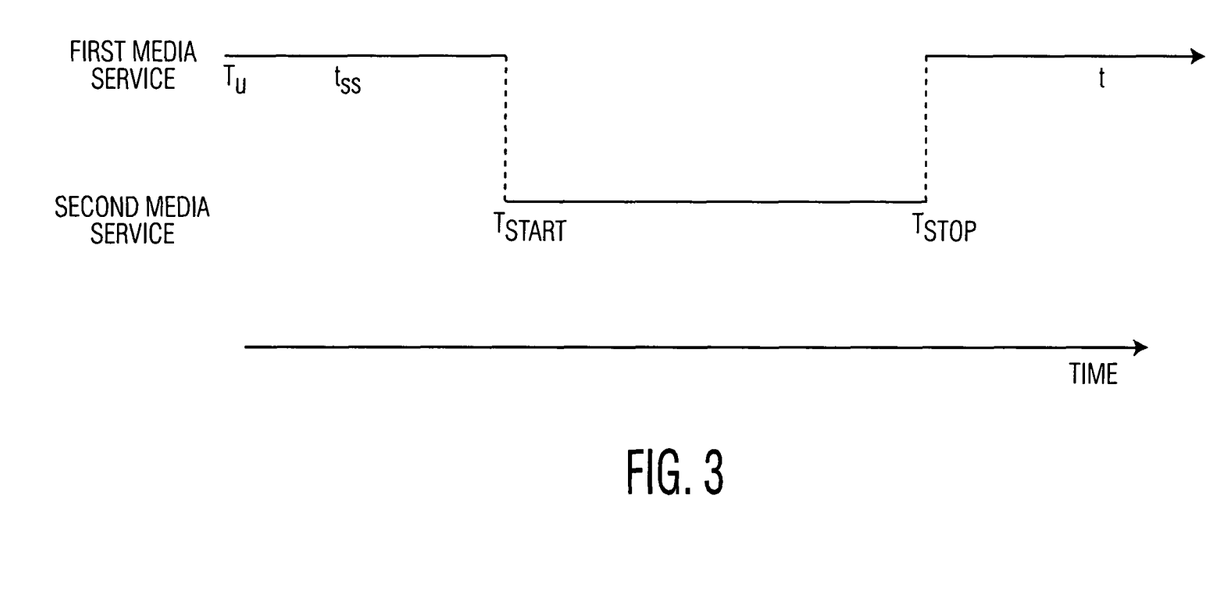
FIGS. 3 to 6 disclose various cases in which media services are acquired in response to schedule and non-scheduled acquisition commands.

FIG. 3 illustrates a first scenario. At a time Tu, a user has specified a first media service. At the time specified at Tss, a scheduled acquisition command is received from a media service provider, where the command indicates that a second media service is to be acquired at a time Tstart. It is also presented that at Tstart, that the second media service is acquired by the user receiver. At Tstop, the scheduled acquisition command expires, and the user receiver automatically (without user intervention) switches back to the first media service.

Figure 4:
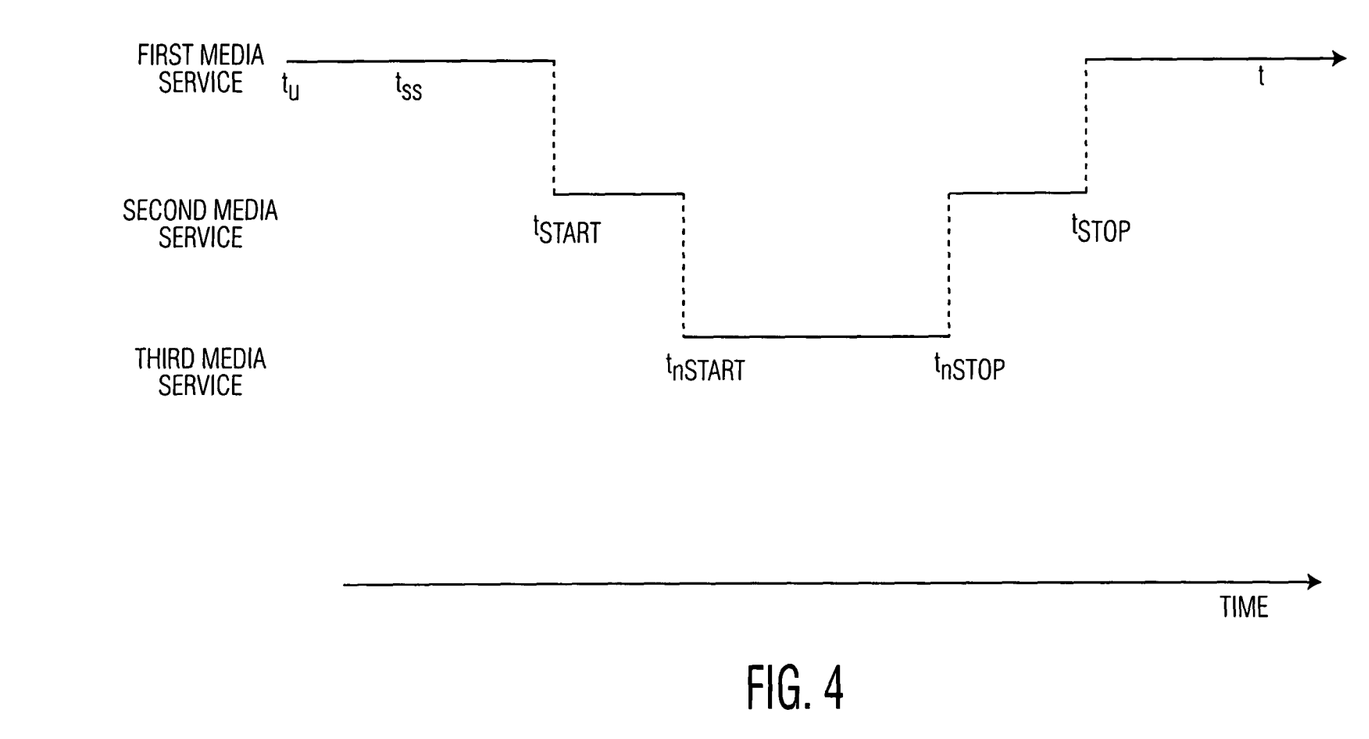

FIG. 4 illustrates another scenario. At a time Tu, a user has specified a first media service. At the time specified at Tss, a scheduled acquisition command is received from a media service provider, where the command indicates that a second media service is to be acquired at a time Tstart. While the second media service is being acquired, at Tnstart, a non-scheduled acquisition command is received from a media source provider, which causes a user receiver to acquire a third media service. At Tnstop, though, the non-scheduled acquisition command expires and the receiver is again free to acquire the second media service. That is, the user receiver changes from receiving the third media service to acquiring the second media service. At Tstop, the scheduled acquisition command expires, and the user receiver automatically (without user intervention) switches back to the first media service.

Figure 5:
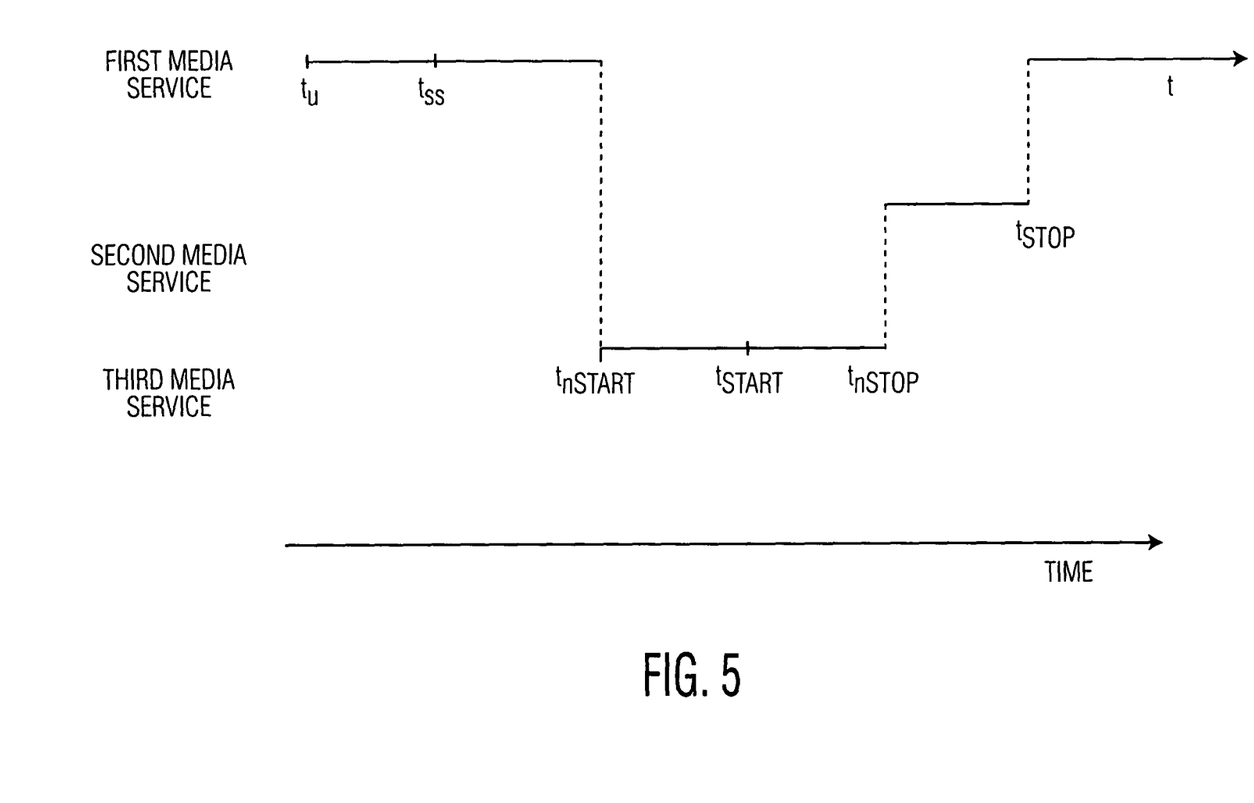

FIG. 5 illustrates an example where the Tnstart command (for the non-scheduled acquisition command) comes before the time when the user receiver is supposed to acquire the second media service. Because a non-scheduled acquisition command takes priority over a scheduled acquisition command, the user receiver will at Tnstart acquire a third media service. The user receiver will not acquire the second media service until the non-scheduled acquisition expires at Tnstop. The second media service will then be acquired until Tstop where the user receiver will switch back to receiving the first media service.

Figure 6:
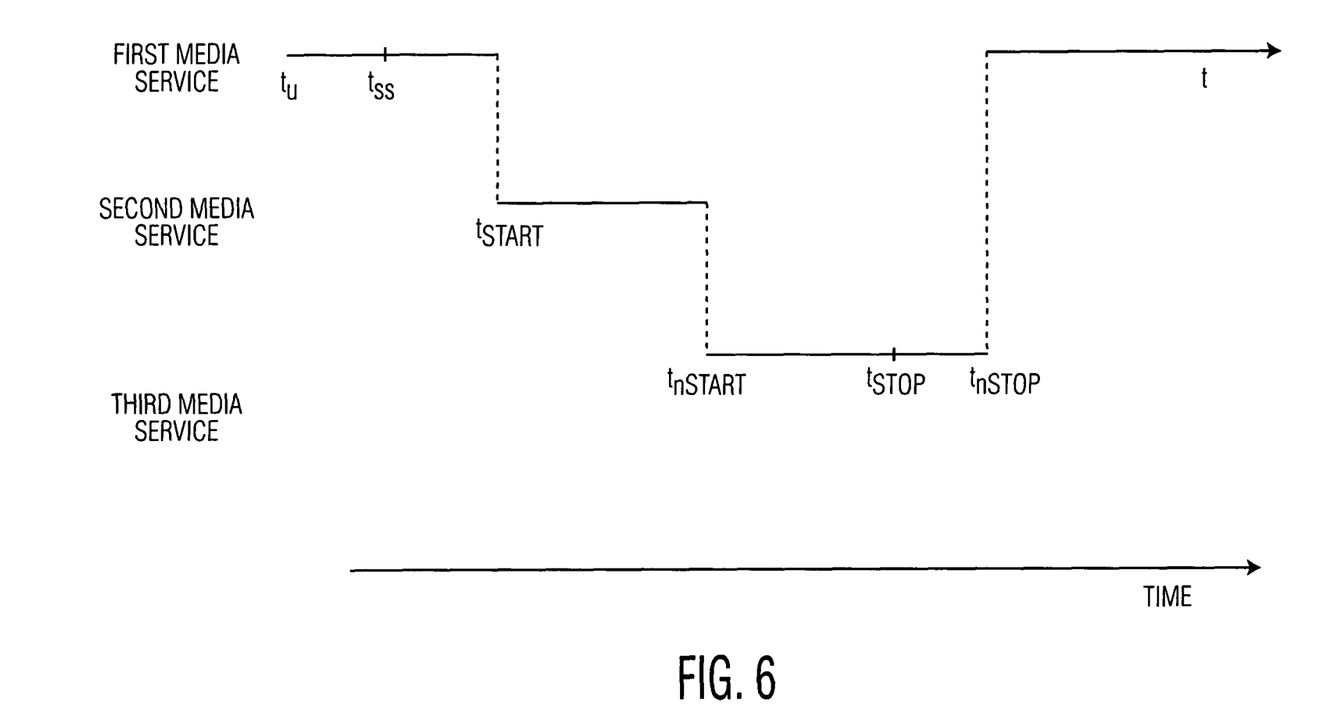

FIG. 6 illustrates an example where after a user receiver starts receiving a second media service at Tstart, a non-scheduled acquisition command is received at Tnstart. The receiver, in response to the non-scheduled acquisition command, will acquire a third media service until the non-scheduled acquisition command expires at Tnstop. In this example though, the scheduled acquisition command expires before (Tstop) the non-scheduled acquisition command (Tnstop). Hence, the receiver changes back to the acquisition of the first media service after Tnstop takes place.

Figure 7:
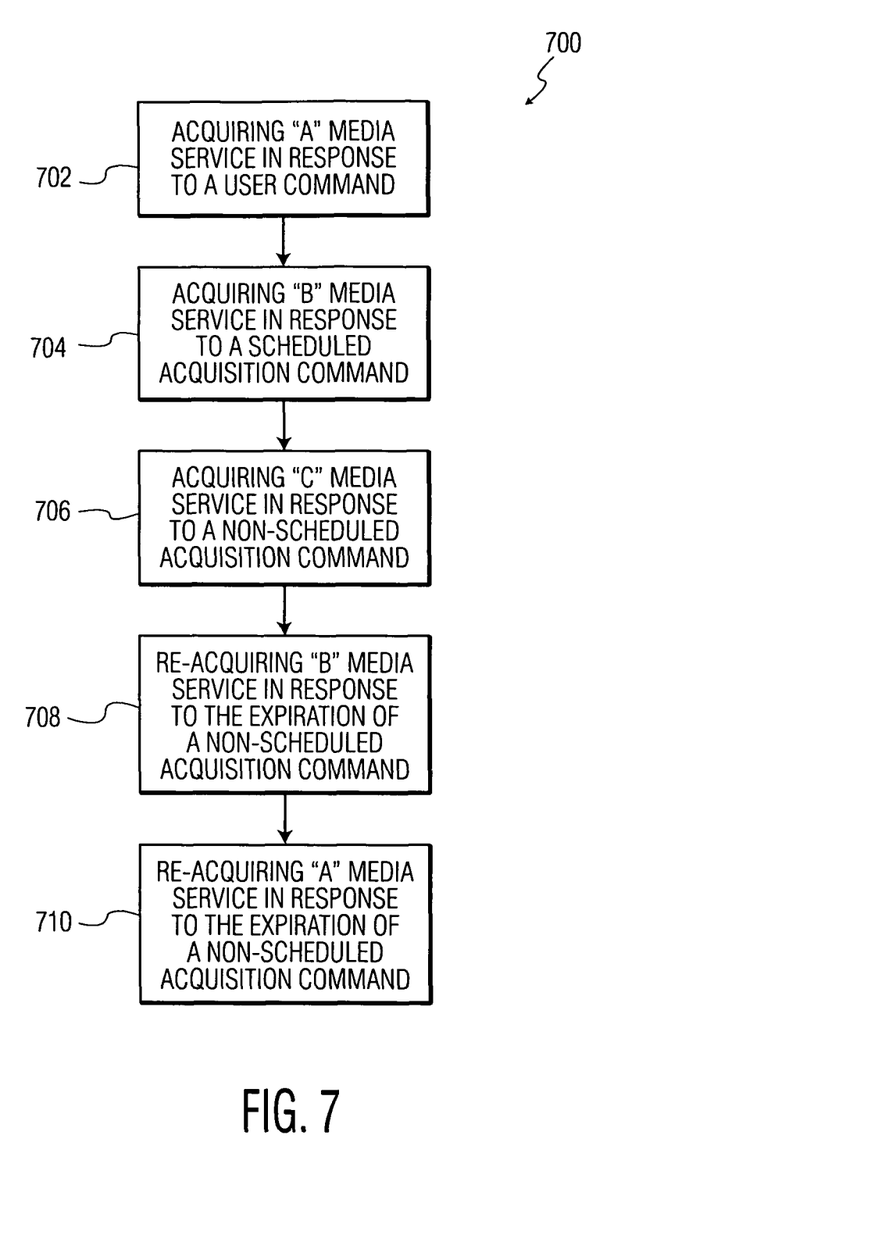
FIG. 7 is a flow chart of an exemplary method demonstrating the acquisition of different media services in response to scheduled and non-scheduled acquisition commands.

FIG. 7 is for a flow chart 700 that demonstrates the acquisition of multiple media services. The media services, which are different media services, are designated as "A" "B" and "C". Step 702 has a user receiver acquiring media service "A" where such an acquisition is performed in response to a user command. At step 704, user receiver acquires media service "B", which is performed in response to the information in a scheduled acquisition command. The acquisition should take place at the time specified in the scheduled acquisition command.

In step 706, a media service "C" is acquired by a user receiver in response to the information in a non-scheduled acquisition command. When the non-scheduled acquisition command expires, in step 708, media service "B" is re-acquired by the user receiver. In step 710, the scheduled acquisition command has expired, which causes the user receiver to automatically and without user intervention re-acquire media service "A".

In an optional embodiment of the invention, storage device 212 will buffer media service "A" when media service "B" is being acquired in response to a scheduled acquisition command. When the scheduled acquisition command expires, media service "A" will be played back automatically from the buffer because user receiver 200 can operate as a personal video recorder. Likewise, an additional embodiment of the invention will buffer both media service "B" and "A" while a media service "C" is being acquired in response to a non-scheduled acquisition command. When the non-scheduled acquisition command expires, the user will have the option of playing back media service "B" and/or "A".

Although embodiments which incorporate the teachings of the present disclosure have been shown and described in detail herein, those skilled in the art can readily devise many other varied embodiments that still incorporate these teachings. Having described preferred embodiments of a method and device for optimal playback positioning in digital content (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for a receiver to acquire media services comprising the steps of:
   acquiring by said receiver a second media service from a second source in response to a scheduled acquisition command;
   acquiring by said receiver a third media service from a third source in response to a non-scheduled acquisition command where said receiver tunes to said third media service automatically without user action;
   acquiring by said receiver said second media service from said second source in response to the expiration of said non-scheduled acquisition command where said receiver tunes to said second media service automatically without user action and said non-scheduled acquisition command expires after a determined time period; and
   acquiring a first media service from a first source when said scheduled acquisition command expires where said receiver tunes to said second media service automatically without user action, where
   a. said step of acquiring of said first media service is performed before said acquiring of said second media service and said third media service; and
   b. re-acquiring said third media service after said expiration of said non-scheduled acquisition command and said expiration of said scheduled acquisition command.

2. The method of claim 1, comprising the additional steps of:
   buffering said first media service after said step of acquiring a second media service from said second source is response to said scheduled acquisition command; and
   said re-acquiring step of said first media service is the playback of said buffered first media service.

3. The method of claim 1, wherein said scheduled acquisition command indicates a time when said scheduled acquisition command expires.

4. The method of claim 3, wherein said non-scheduled acquisition command is only used for an alert.

5. The method of claim 1, wherein said scheduled acquisition command and said non-scheduled acquisition command is communicated to said user receiver only through a provider of a media source.

6. The method of claim 5, wherein said provider of a media source is at least one of a: service provider, an internet service provider, a television broadcaster, a radio broadcaster, a multiple service operator, a cable operator, a telephony operator, a digital subscriber line operator, a satellite operator, a fiber optic line operator, an internet protocol television service provider, and a streaming media service provider, a cell phone service provider, over the top service provider, and a mobile device service provider.

7. The method of claim 5, wherein a provider of said second media source a provider of said third media source are the same.

8. The method of claim 6, wherein said provider of a media source is not a user operating said user receiver.

9. The method of claim 6, wherein said second media source and said third source are different, and said provider of a media source provides both second media source and third media source.

10. The method of claim 1, wherein said non-scheduled acquisition command indicates a time when said non-scheduled acquisition command expires.

11. The method of claim 1, wherein
   said second media service is at least one of: a video media, an audio media, a television show, a movie, an interactive service, a video game, a video on demand, an audio/video broadcast, a radio program, alert, and a podcast; and
   said third media service is at least one of: a video media, an audio media, a television show, a movie, an interactive service, a video game, a video on demand, an audio/video broadcast, a radio program, alert, and a podcast.

12. The method of claim 1, wherein
   said second media source is at least one of an over the air television broadcaster, a cable television broadcaster, a satellite television broadcaster, a radio broadcaster, a source that transmits said media service in the form of internet protocol packets, a streaming media service source, a source of a video on demand media service, a source of a podcast, a source of a video game, a source of an interactive service, a source of an audio/video broadcast, and
   said third media source is at least one of an over the air television broadcaster, a cable television broadcaster, a satellite television broadcaster, a radio broadcaster, a source that transmits said media service in the form of internet protocol packets, a streaming media service source, a source of a video on demand media service, a source of a podcast, a source of a video game, a source of an interactive service, a source of an audio/video broadcast.

13. The method of claim 1, where said acquiring is at least one of tuning to a first broadcast channel, downloading, switching from a first broadcast channel to a second broadcast channel, joining an internet protocol address, switching from a first internet protocol address to a second internet protocol address, accessing a media service.

14. The method of claim 1, where said acquiring of a third media service causes a user receiver to switch from a first internet protocol address to a first broadcast channel to receive said third media service.

15. The method of claim 1, wherein said acquiring of said third media service causes a user receiver to switch from a first broadcast channel to a first internet protocol address to receive said third media service.

16. The method of claim 1, wherein
a. said scheduled acquisition command is an Advanced Television Systems Committee (ATSC) A/65 forced channel change,
b. said non-scheduled acquisition command is a Society of Cable Telecommunications Engineers (SCTE) 18 Emergency Alert command;
c. and said commands are received via code images formatted in respect to an OpenCable Common Download Specification 2.0.

* * * * *